United States Patent [19]

Lefsky et al.

[11] Patent Number: 5,019,971
[45] Date of Patent: May 28, 1991

[54] HIGH AVAILABILITY CACHE ORGANIZATION

[75] Inventors: Brian Lefsky, West Newton; Mary E. Natusch, Westford, both of Mass.

[73] Assignee: Prime Computer, Inc., Natick, Mass.

[21] Appl. No.: 396,785

[22] Filed: Aug. 21, 1989

Related U.S. Application Data

[63] Continuation of Ser. No. 37,695, Apr. 13, 1987, abandoned.

[51] Int. Cl.[5] .............................................. G06F 9/30
[52] U.S. Cl. .................................. 364/200; 364/243; 364/243.4; 364/243.41
[58] Field of Search ... 364/200 MS File, 900 MS File

[56] References Cited

U.S. PATENT DOCUMENTS 4,095,283  6/1978  Campbell et al. .............. 364/200 X

FOREIGN PATENT DOCUMENTS 2022885  4/1979  United Kingdom .

OTHER PUBLICATIONS

Motorola MC68020 32-Bit Microprocessor User's Manual, 1985, pp. 7-1 thru 7-4.

Patent Abstracts of Japan, vol. 10, No. 86, JP-A-60221855, Hitachi Seisakusho K.K., 11-6-1985.
IBM Technical Disclosure Bulletin, vol. 25, No. 12, May 1983, pp. 6503-6509, D. E. Doyle: "Redundant LRU Encoding for Cache Directories".

Primary Examiner—Gary V. Harkcom
Assistant Examiner—Michael A. Jaffe
Attorney, Agent, or Firm—Wolf, Greenfield & Sacks

[57] ABSTRACT

A high availability set associative cache memory for use as a buffer between a main memory and a central processing unit includes multiple sets of cache cells contained in two or more cache memory elements. Each of the cache cells includes a data field, a tag field and a status field. The status field includes a force bit which indicates a defective cache cell when it is set. Output from a cache cell is suppressed when its force bit is set. The defective cache cell is effectively mapped out so that data is not stored in it. As long as one cell in a set remains operational, the system can continue operation. The status field also includes an update bit which indicates the update status of the respective cache cell. Replacement selection logic examines the bit pattern in all the cache cells in a set and selects a cache cell to be replaced using a first-in first-out algorithm. The state of the update bit is changed each time the data in the respective cache cell is replaced unless the cache cell was modified on a previous store cycle.

15 Claims, 4 Drawing Sheets

HIGH AVAILABILITY CACHE ORGANIZATION

This application is a continuation of application Ser. No. 07/037,695, filed Apr. 13, 1987, now abandoned.

FIELD OF THE INVENTION

This invention relates to high speed cache memory buffers for use in computer systems and, more particularly, to a cache memory wherein status bits for mapping out defective cache cells and for controlling cache memory data replacement are stored in distributed fashion in each of the cache cells.

BACKGROUND OF THE INVENTION

A cache memory is a relatively small, high speed memory used as a buffer between a central processing unit (CPU) and a main memory in order to increase operating speed. The cache memory has an access time which is substantially shorter than the access time of the main memory. The utility of the cache memory arises from the fact that computer programs have a tendency to reference localized areas of main memory over a given interval of time. By transferring that localized area of main memory to the faster cache memory for access by the CPU, overall operating speed is increased.

When a cache memory is used, the CPU looks for a referenced memory location in the cache memory. When the referenced address is found in the cache memory, known as a cache hit, the program proceeds normally. When the referenced memory location is not found in the cache memory, known as a cache miss, the referenced memory location must be accessed in the main memory. When a miss occurs, the data from the referenced location can be placed in the cache memory for future use. Data can also be stored in the cache memory under program control without first detecting a miss.

Cache memories are commonly sized to correspond to a multiple of virtual memory pages. A page of memory is made up of a multiple of blocks, and within a page there is a one-to-one correspondence between virtual memory blocks and physical memory blocks. The cache memory will hold a copy of data from main memory along with a corresponding tag identifying the page of main memory. The cache index address identifies the location of the block within a group of consecutive virtual memory pages. Thus, the cache memory stores a tag field and a data field. To increase the effectiveness of the cache memory, it is known to use a set associative mapping technique wherein two or more cache memory elements provide a set of cache cells at each cache index address location. With this arrangement, data from two or more main memory blocks can be stored at a given cache index address. When the CPU attempts to store a main memory word in cache memory, there are two or more possible locations in the set where the word can be stored. This arrangement reduces "thrashing" wherein memory words are constantly swapped in and out of the cache memory and increases the operating speed of the system.

When a cache miss occurs and during store operations, it is necessary to replace the data in one of the elements of the set. Various algorithms are known in the art for selecting the cache cell to be replaced. These algorithms include random replacement, first-in first-out (FIFO) and least recently used (LRU). It is desirable to implement the replacement algorithm in minimum time and with a minimum of circuitry. The random approach provides relatively unpredictable behavior, while the least recently used technique requires that status be taken on every cache memory access. The FIFO approach, while not as effective as LRU, provides acceptable performance and is relatively easy to implement. The conventional means for implementing a FIFO algorithm is to maintain a separate status memory. The status memory is common for all the elements and tracks information for a particular index for all the elements. Whenever a block needs to be replaced, the status memory is queried for the appropriate element to be modified. During the element update, the status memory is modified to indicate which element should be updated the next time a block is to be modified. The problem with this method is that special control logic is required to update the status memory when any of the elements are modified.

A further consideration with respect to a cache memory is to insure high reliability and to minimize downtime. When the cache memory has only a single element for each index address, the system fails when a fault occurs in one of the cache cells. In a set associative cache memory, there are two or more cache cells available at each index address. However, the additional memory elements and the advent of high density memory devices tends to reduce reliability. It is desirable to provide a technique for maintaining system operation with slightly reduced capability when one of the cache cells in a set is defective.

It is a general object of the present invention to provide an improved cache memory for use in computer systems.

It is another object of the present invention to provide a cache memory having high availability to the user.

It is a further object of the present invention to provide a set associative cache memory including means for mapping out defective cache cells so that system operation can be continued.

It is yet another object of the present invention to provide a cache memory wherein status information is stored in distributed fashion in each of the cache cells.

It is yet another object of the present invention to provide a cache memory wherein a fault indicating bit is stored in each cache cell.

It is yet another object of the present invention to provide a cache memory wherein a single update bit used for controlling cache memory data replacement is stored in each cache cell.

It is a still further object of the present invention to provide a cache memory which is simple in construction and low in cost.

SUMMARY OF THE INVENTION

According to the present invention, these and other objects and advantages are achieved in a high availability set associative cache memory for use as a buffer between a main memory and a central processing unit. The cache memory comprises multiple sets of cache cells contained in a plurality of cache memory elements, each of the cache cells including a data field, a tag field and a status field, and each of the sets of cache cells including a commonly addressed cache cell from each of the memory elements, means for reading data from the cache memory including means for addressing a prescribed set of the cache cells, means for comparing the tag field for each cache cell in the prescribed set with a physical address and for providing a hit signal when the tag field and the physical address are equal, and output enable means responsive to the hit signal for enabling one of the cache cells in the prescribed set to provide its data field to said central processing unit. The cache memory further includes write means for storing data from the main memory in the prescribed set of cache cells.

According to one aspect of the invention, the status field includes a force bit which indicates a defective cache cell when it is set, and the output enable means is responsive to the force bit to suppress a cache cell output when the force bit is set. The write means further includes means for selectively setting or clearing the force bit for each cache cell when the respective cache cell is found to be defective. When the force bit is set for a particular cache cell, that cell is effectively mapped out so that data from the main memory will not be stored in it. As long as one cache cell in each set of the cache memory remains operational, the system can continue operation, although at a somewhat reduced speed. Therefore, the use of the force bit for mapping out defective cells increases the availability of the system to the user.

According to another aspect of the present invention, the status field of each cache cell includes an update bit which indicates the update status of the respective cache cell, and the write means includes replacement selection means responsive to the update bit for each cache cell in a prescribed set for selecting which cache cell of the prescribed set is to have its data replaced. The replacement selection means examines the bit pattern in all of the cache cells in the prescribed set in order to select the cache cell to be replaced. In a preferred embodiment, the write means includes means for changing the state of the update bit each time the data in that cache cell is replaced. In another preferred embodiment, the write means includes means for changing the state of the update bit each time the data in the respective cache cell is replaced unless the cache cell was modified on a previous store cycle. A first-in first-out replacement algorithm is used.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

Figure 1:
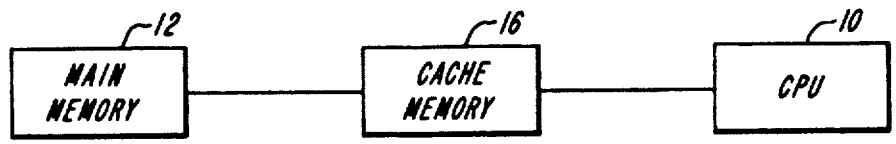
FIG. 1 is block diagram of a computer system utilizing a cache memory.

A computer system utilizing a cache memory is illustrated in block diagram form in FIG. 1. A central processing unit (CPU) 10 communicates with a main memory 12 through a cache memory 16. As noted above, the cache memory 16 acts as a buffer between the main memory 12 and the CPU 10 in order to increase operating speed. The main memory 12 has a relatively large capacity and a relatively long access time. In an example to be described hereinafter, the main memory 12 includes multiple pages, where each page is made up of 512 blocks each having one data word of 32 bits plus 4 bits of parity. The cache memory 16 has a relatively small capacity and a relatively short access time. By transferring data from frequently-referenced memory locations into the cache memory 16 and causing the CPU 10 to reference the cache memory 16, the operating speed of the system is increased. The cache memory 16 may provide space for one or more blocks of data from the main memory 12. In the present invention, the cache memory 16 is provided with two or more commonly-addressed elements in a set associative configuration as described hereinafter.

Figure 2B:
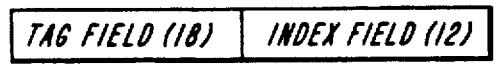
FIG. 2B illustrates the division of a main memory address, into a tag field and an index field.
Figure 2A:
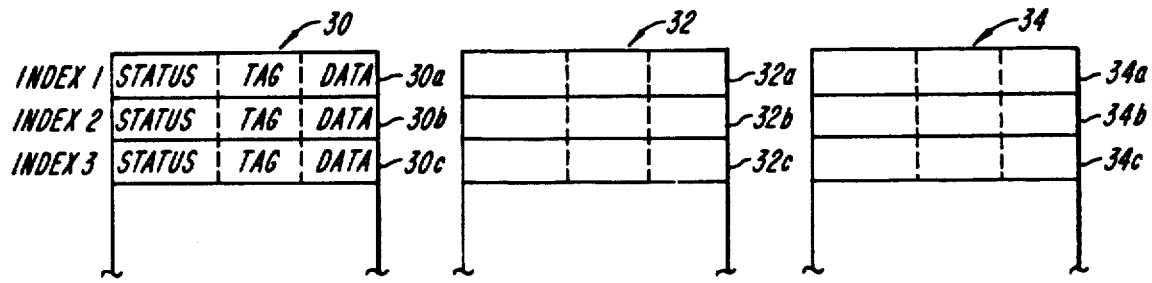
FIG. 2A is a schematic diagram of the cache memory organization in accordance with the present invention.

The organization of the cache memory 16 in accordance with the present invention is illustrated in FIG. 2A. Since the cache memory 16 has a smaller capacity than the main memory 12, it has a smaller address space. Addressing of the cache memory 16 is performed in conventional manner by dividing the main memory address into a tag field and an index field, as shown in FIG. 2B. The index field comprises the least significant bits of the virtual memory address corresponding to the address space of the cache memory, while the tag field comprises the most significant bits of the main memory address. The tag field identifies a page of main memory while the index field identifies a location within a group of virtual pages. In the example described herein, the index field includes 12 bits for addressing a 4K cache memory and the tag field contains 18 bits, 16 data bits plus 2 parity bits to address 64K physical pages.

A set associative cache memory includes two or more cache memory elements. Cache memory elements 30, 32 and 34 are shown in FIG. 2A. Cache memory element 30 includes a plurality of cache cells 30a, 30b, 30c. . . ; cache memory element 32 includes a plurality of cache cells 32a, 32b, 32c. . . ; and cache memory element 34 includes a plurality of cache cells 34a, 34b, 34c. . . One cache cell from each of the memory elements 30, 32, 34 has the same index address. For example, cache cells 30a, 32a and 34a are commonly addressed by index address 1; cache cells 30b, 32b and 34b are commonly addressed by index address 2; etc. The commonly addressed cache cells define a set which is associated with a single index address. In the above example, each of the cache memory elements 30, 32, 34 contains 4K cache cells and the overall cache memory contains 12K cache cells.

The data structure of the cache cells is illustrated in FIG. 2A. Each cache cell includes a data field which contains the data stored in the corresponding location in main memory, a tag field which identifies the page of main memory from which the data was taken and a status field which contains information regarding the status of the cache cell. The status field is described in detail hereinafter. In a preferred embodiment, the data field contains 36 bits, 32 data bits plus 4 parity bits, the tag field contains 18 bits, 16 data bits plus 2 parity bits, and the status field contains 3 bits. In the cache memory structure shown in FIG. 2A, each set of cache cells can store three main memory words from corresponding positions in three different pages of main memory. The page is identified by the tag field.

The status field of the cache cell shown in FIG. 2A contains three status-indicating bits. A conventional valid bit indicates whether or not the cache cell contains valid data. The valid bit is cleared upon system initialization. When a main memory word is stored in the cache cell, the valid bit is set and typically remains set except in the case of parity errors. In systems with larger block sizes, the valid bits will indicate which words within the block are valid. The status field also contains a force bit which indicates whether the cache cell is operational. During normal operation the force bit is reset. If the cache cell experiences a failure, the failure is detected by the read circuitry and the force bit is set to indicate a defective cache cell. Thereafter, no data is stored in that cache cell and its outputs are ignored. The status field further includes an update bit which is utilized in conjunction with the update bits from the other cache cells in the same set to determine the cache cell to be replaced during a replacement cycle.

Figure 3:
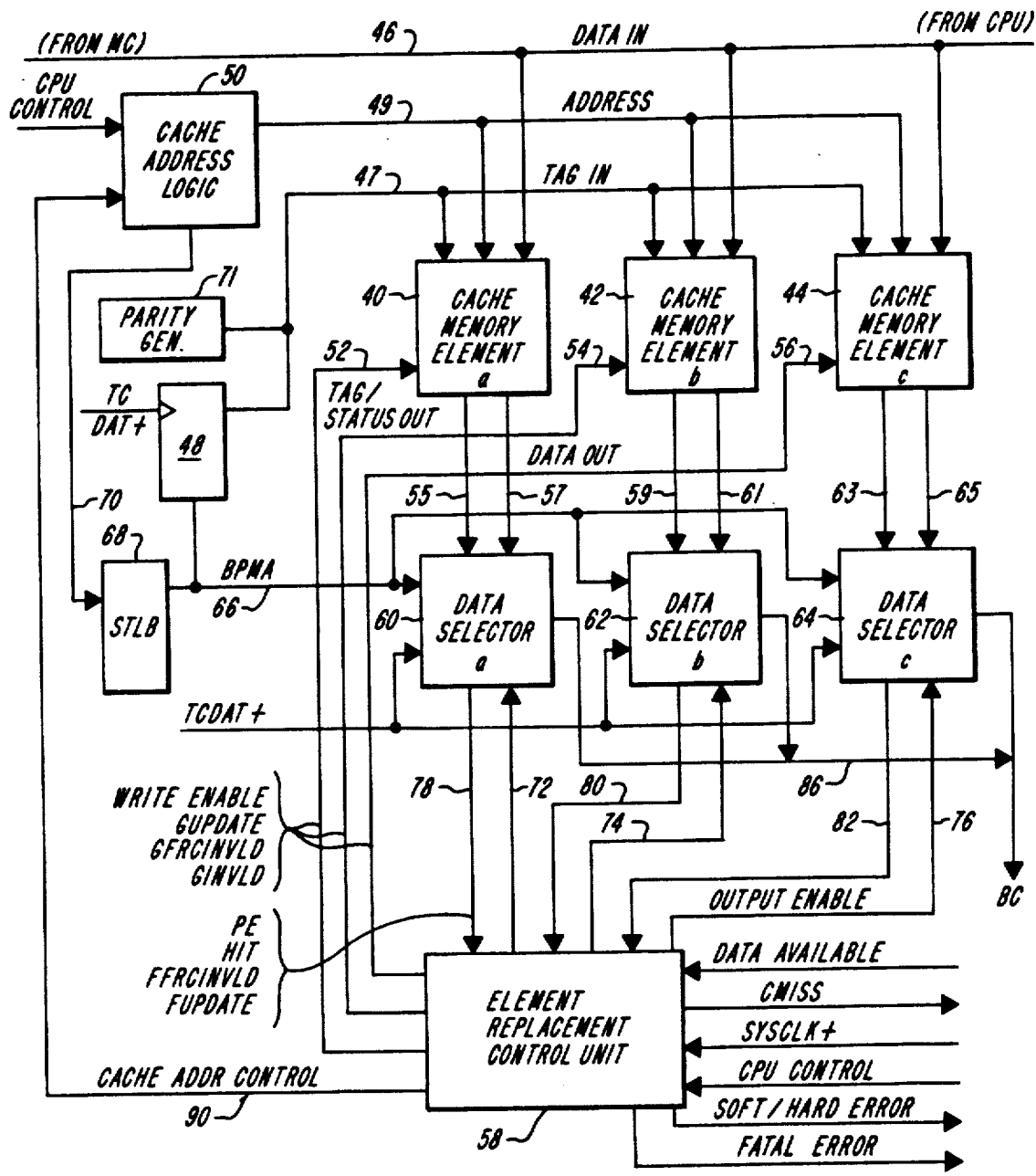
FIG. 3 is a block diagram of a cache memory in accordance with the present invention.

A block diagram of the cache memory of the present invention is shown in FIG. 3. Cache memory elements 40, 42, 44 comprise a three-way set associative cache memory having the organization shown in FIG. 2A. Each of the cache elements 40, 42, 44 in the present example includes 4K cache cells. While the example described herein includes three cache memory elements, it will be understood that the set associative cache memory can include two or more elements, as required by the application. Each of the cache cells 40, 42, 44 receives DATA IN from a data bus 46, TAG IN on a bus 47 from a tag register 48 and an ADDRESS on a bus 49 from cache address logic 50. The cache memory elements 40, 42, 44 further receive control signals on control buses 52, 54, 56, respectively, from an element replacement control unit 58. The control signals for each cache memory element include a WRITE ENABLE signal which enables data, tag and status information to be stored in the addressed cache cell and GUPDATE, GFRCINVLD and GINVLD signals which set or clear corresponding bits in the status field as described hereinafter. The outputs of the cache memory elements 40, 42, 44 include TAG/STATUS OUT which are the tag field and the status field stored in the addressed cache cell and DATA OUT which is the data field in the addressed cache cell. It will be understood that many of the signals described herein, particularly data and address, are carried in parallel on multiconductor buses.

TAG/STATUS OUT and DATA OUT from cache memory element 40 are supplied on buses 55 and 57, respectively, to a data selector 60; TAG/STATUS OUT and DATA OUT from cache memory element 42 are connected on buses 59 and 61, respectively, to a data selector 62; and TAG/STATUS OUT and DATA OUT from cache memory element 44 are connected on buses 63 and 65, respectively, to a data selector 64. Each of the data selectors 60, 62, 64 receives a BPMA signal on a bus 66 from an STLB unit 68. The STLB unit 68, or segmentation table look-aside buffer is a conventional circuit for converting a virtual address to a physical memory address in a system utilizing virtual addressing. The STLB can be implemented using an update bit and a force bit as described herein for a cache memory. The STLB 68 receives a virtual address on a bus 70 from the cache address logic 50. The BPMA signal represents the index field of the physical memory address being stored in, or read from, the cache memory. In systems where a virtual addressing scheme is not utilized, the STLB 68 can be omitted since all memory addresses will be physical memory addresses. The bus 66 carrying the BPMA signal is also connected to the data input of the tag register 48. The output of the tag register 48 is used for writing the tag field into the cache memory. A parity generator 71 connected on the bus 47 generates parity for the tag field. Each of the data selectors 60, 62, 64 and the tag register 48 receive a TCDAT+signal which is a timing clock supplied from the element replacement control unit 58.

The data selectors 60, 62, 64 receive separate OUTPUT ENABLE signals on lines 72, 74 and 76, respectively, from the element replacement control unit 58. The OUTPUT ENABLE signals enable one of the data selectors 60, 62, 64 to supply data from one of the cache memory elements 40, 42, 44. The data selectors 60, 62, 64 provide status signals on buses 78, 80, 82, respectively, to the element replacement control unit 58. The status signals on each of the buses 78, 80, 82 include a parity error PE signal which indicates that a parity error has been found either in the data or in the tag field, a HIT signal which indicates that the required physical memory address has been found in the cache memory and FFRCINVLD and FUPDATE signals which are readouts of the status field from the addressed cache cell. Each of the data selectors 60, 62, 64 has an output BC connected to a cache bus 86 which is the data output of the cache memory and is connected to the CPU.

The element replacement control unit 58 supplies control signals to cache memory elements 40, 42, 44 on control buses 52, 54, 56, respectively, as described above. In addition, unit 58 supplies OUTPUT ENABLE signals to the data selectors 60, 62, 64 on lines 72, 74, 76, and receives status signals on buses 78, 80, 82, as described above. The element replacement control unit 58 also supplies a CACHE ADDR CONTROL signal to the cache address logic 50 on a line 90 and supplies SOFT/HARD ERROR and FATAL ERROR signals to the CPU. Additional signals connected to the element replacement control unit 58 include a DATA AVAILABLE signal from the memory controller, CPU CONTROL signals, a SYSCLK+clock signal and a CMISS signal indicating a cache miss.

Figure 4:
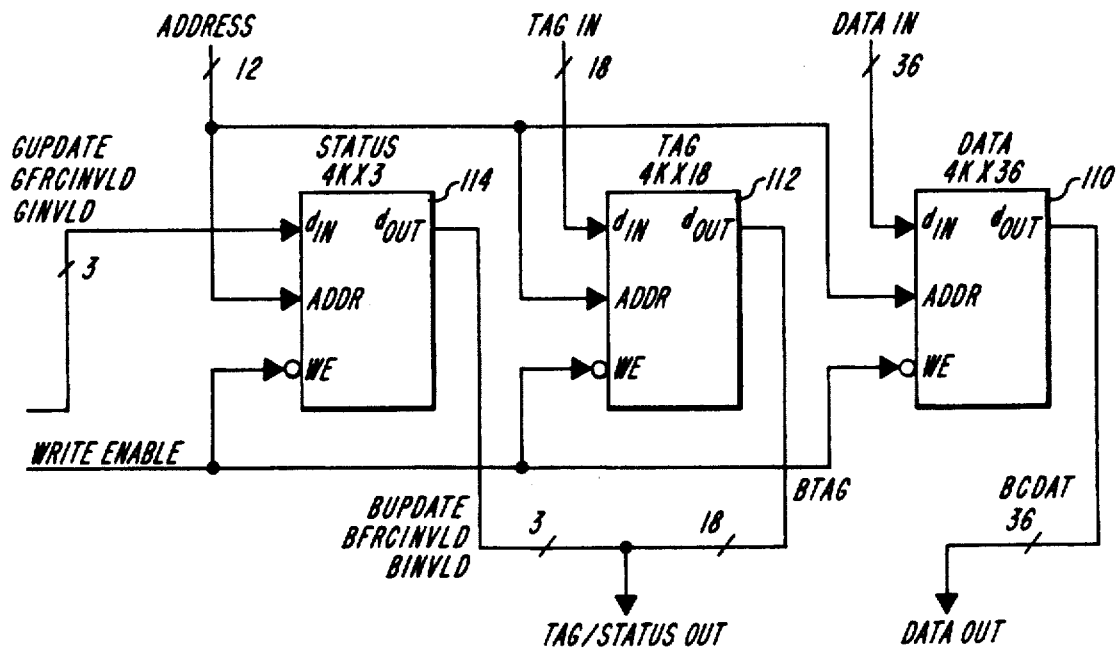
FIG. 4 is a block diagram of one of the cache memory elements of FIG. 3.

A cache memory element representative of the cache memory elements 40, 42, 44 is shown in block diagram form in FIG. 4. A high speed memory block 110 stores the data fields, a high speed memory block 112 stores the tag fields and a high speed memory block 114 stores the status fields. In the example wherein each cache memory element contains 4K cache cells, each of the memory blocks 110, 112, 114 contains 4K by the number of bits in the respective field. Together, the memory blocks define 4K cache cells. Each of the memory blocks 110, 112, 114 includes high speed static random access memory devices such as type 10484-4K×4 static RAM. In systems with larger block sizes, the address field for the tag and status RAM's is reduced so that a single tag will be used for the entire block. The ADDRESS from bus 49 is connected to the address inputs of each of the memory blocks 110, 112, 114. The GUPDATE, GFRCINVLD and GINVLD signals are connected to the data inputs of memory block 114. The TAG IN signals are connected to the data inputs of memory block 112, and the DATA IN signals are connected to the data inputs of memory block 110. The WRITE ENABLE input is connected to the write enable input of each of the memory blocks 110, 112, 114. The data outputs of memory blocks 112 and 114 provide the TAG/STATUS OUT signals from the cache memory element, and the data outputs of memory block 110 provide the DATA OUT signals from the cache memory element. The status portion of the TAG/STATUS OUT signals includes BUPDATE, BFRCINVLD and BINVLD, which are the status bits stored in the cache cell.

Figure 5:
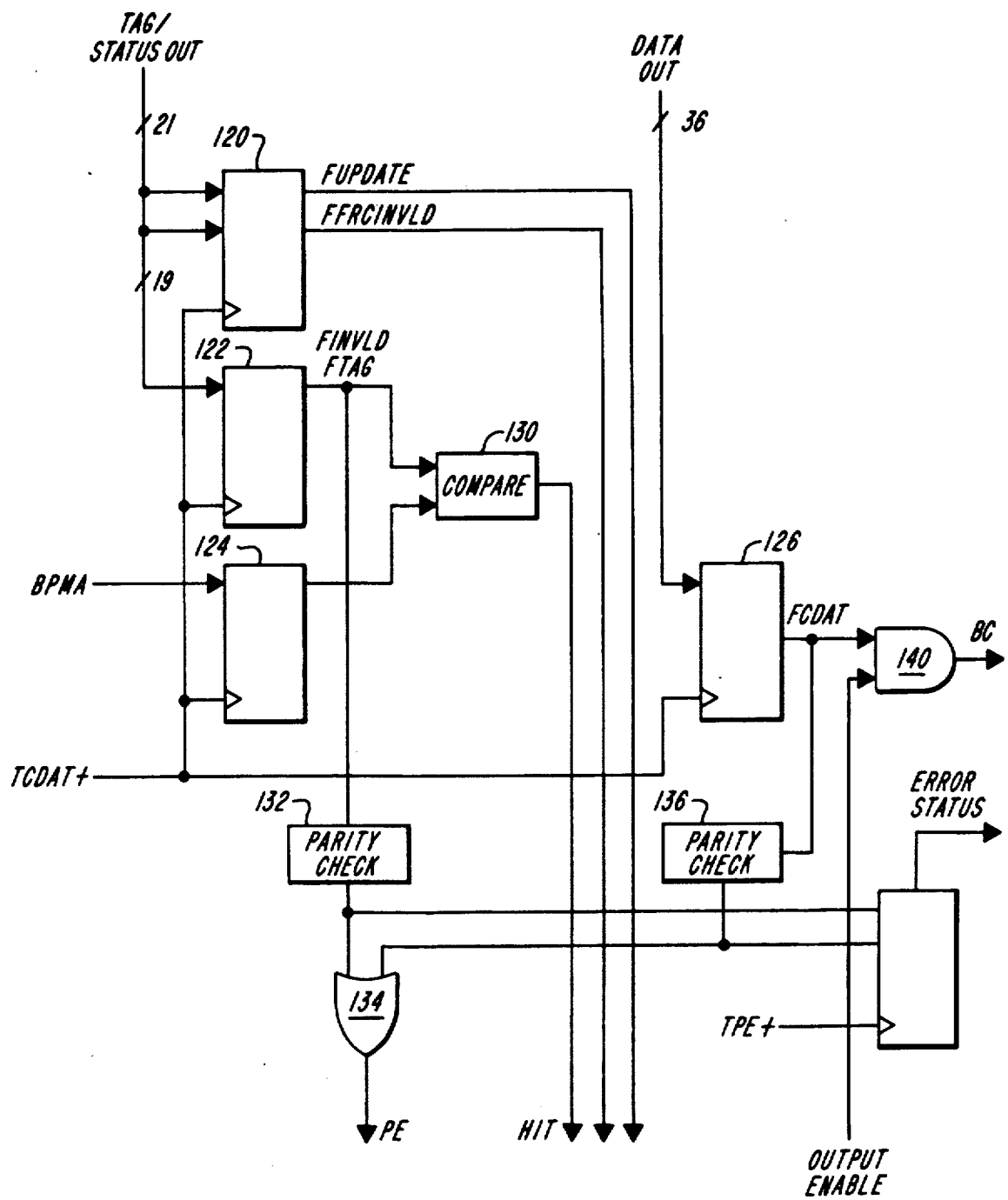
FIG. 5 is a block diagram of one of the data selectors of FIG. 3.

A data selector representative of the data selectors 60, 62, 64 is shown schematically in FIG. 5. The TAG/STATUS OUT signals from the cache memory element are connected to the data inputs of registers 120 and 122, with the tag field and BINVLD from the status field being connected to register 122, and BUPDATE and BFRCINVLD from the status field being connected to register 120. The BPMA physical memory page address signals are connected to the data inputs of a register 124, and the DATA OUT signals from the cache memory element are connected to the data inputs of a register 126. It will be understood that each of the registers 120, 122, 124, 124 includes a sufficient number of storage elements to contain the bits in the respective data fields. The clock signal TCDAT+ is supplied to the clock inputs of each of the registers 120, 122, 124 and 126.

The outputs of the register 122 and the outputs of the register 124 are supplied to the two inputs of a digital comparator 130. The output of comparator 130 is the HIT signal and is in an active state when the two digital words at its inputs are equal. The HIT signal indicates that the referenced memory word has been found in cache memory. The outputs of register 122 are also supplied to a parity checker 132 which detects parity errors in the tag field. The output of the parity checker 132 is supplied to one input of an OR gate 134. The output of parity checker 132 is active when a parity error is found. The outputs of register 126 are supplied to a parity checker 136 which detects parity errors in the data field. The output of parity checker 136, which is active upon detection of a parity error in the data field, is connected to another input of the OR gate 134. The output of OR gate 134 is the PE signal indicating a parity error in either the tag field or the data field. The outputs of register 126 are also supplied to one input of an AND gate 140. Another input to AND gate 140 is the OUTPUT ENABLE signal from the element replacement control unit 58. When the OUTPUT ENABLE signal is active, the AND gate 140 supplies the data at its output BC to the cache bus 86. The outputs of register 120 are FFRCINVLD and FUPDATE, which together with the HIT and PE signals, comprise the status signals supplied from each data selector to the element replacement control unit 58.

Figure 6:
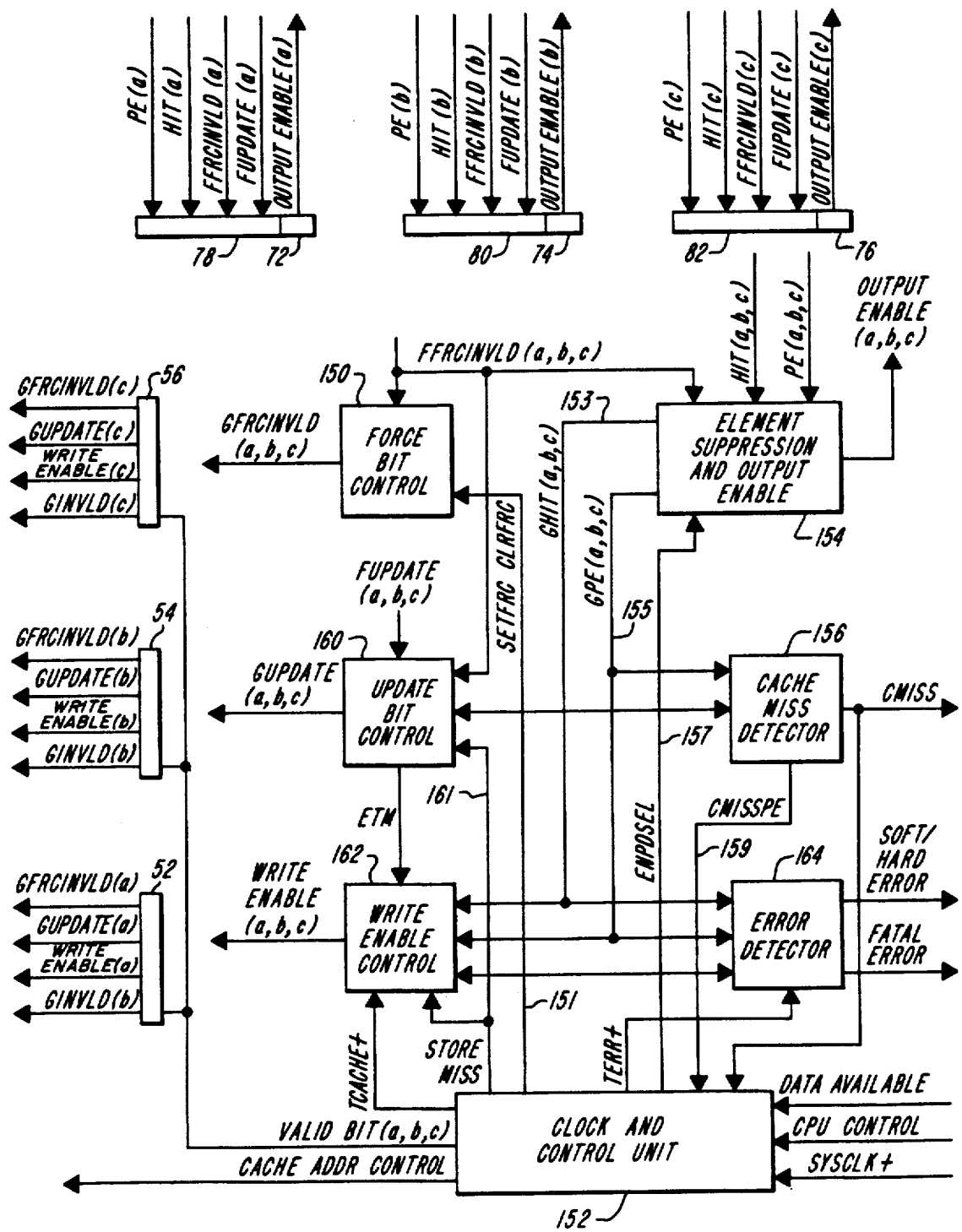
FIG. 6 is a block diagram of the element replacement control unit of FIG. 3.

A block diagram of the element replacement control unit 58 is shown in FIG. 6. This unit includes the logic for enabling the cache memory elements when a cache hit is detected, for controlling writing into the cache memory, for selecting the cache cell to be updated, for mapping out defective cache cells and for notifying the CPU of cache misses and of error conditions.

A force bit control 150 modifies the force bits from the status field in each cache cell under CPU control. The force bit control 150 receives the FFRCINVLD signals on buses 78, 80, 82 from each of the data selectors 60, 62, 64 and receives SETFRC and CLRFRC signals on a bus 151 from a clock and control logic unit 152. The SETFRC and CLRFRC signals originate in the CPU. The force bit for each element is modified in the force bit control 150. The CPU controls the force bit using the control signals SETFRC, a set force bit command, and CLRFRC, a clear force bit command. Under normal operation, SETFRC and CLRFRC are inactive. The logic function of the force bit control 150 is given in Table 1. The GFRCINVLD signals for storage in the status fields of the cache cells are supplied from the force bit control 150 to the cache memory elements 40, 42, 44 on the buses 52, 54, 56, respectively. The algorithm shown in Table 1 is applied to each element independently and there is no interaction between elements. In each of the tables included herein, "1" indicates an active or true state, "0" indicates an inactive or false state and "x" indicates a don't care state. The functions shown in Tables 1-6 can be implemented in combinatorial logic, in read only memories or in a combination thereof.

TABLE 1

| FFRCINVLD | SETFRC | CLRFRC | GFRCINVLD |
|---|---|---|---|
| 0 | 0 | 0 | 0 |
| 1 | 0 | 0 | 1 |
| x | 1 | 0 | 1 |
| x | 0 | 1 | 0 |
| x | x | x | x |

An element suppression and output enable unit 154 receives the PE, HIT and FFRCINVLD signals from each of the data selectors 60, 62, 64 on buses 78, 80, 82 and provides gated hit signals GHIT on a bus 153 and gated parity error signals GPE on a bus 155 in accordance with the algorithm shown in Table 2. The algorithm is applied to each cache memory element independently and there is no interaction between elements. The force bit FFRCINVLD causes the information from a cache cell to be ignored when the bit is set and indicates a faulty cache cell.

TABLE 2

| FFRCINVLD | HIT | PE | GHIT | GPE |
|---|---|---|---|---|
| 0 | 0 | x | 0 | x |
| 0 | 1 | x | 1 | x |
| 0 | x | 0 | x | 0 |
| 0 | x | 1 | x | 1 |
| 1 | x | x | 0 | 0 |

The element suppression and output enable unit 154 also receives an ENPDSEL signal from the clock and control logic unit 152 on a line 157 and provides OUTPUT ENABLE signals to the data selectors 60, 62, 64 on lines 72, 74, 76. The output enable function is generally a function of the HIT signal. However, during a cache miss, if the miss was due to a parity error, the OUTPUT ENABLE signal will also be a function of any parity errors that may remain. The ENPDSEL, enable parity in data selection, signal indicates the need for special treatment of the output enable function. All elements that had a parity error are reloaded in an attempt to eliminate soft errors from the cache cells. A soft error is a transient error. On the re-read after the cache miss, only good data is enabled onto the cache bus 86. If the parity error persists, then a control program in the CPU maps out the defective cache cell at a later time. The OUTPUT ENABLE signal is a function of FFRCINVLD, ENPDSEL, HIT and PE signals as shown in Table 3. Logically, the output enable function doesn't require interaction between elements. If the HIT signal indicates hit, then the cache memory element has valid data. If more than one cache memory element drives the same valid data on the cache bus 86, the correct data is sent to the CPU. However, in some logic families, this condition is not recommended. To resolve the conflict, a priority encoder can be used to prioritize the signals and to activate only one OUTPUT ENABLE signal and leave the rest inactive.

TABLE 3

| FFRCINVLD | ENPDSEL | HIT | PE | OUTPUT ENABLE |
|---|---|---|---|---|
| 1 | x | x | x | 0 |
| 0 | 0 | 0 | x | 0 |
| 0 | 0 | 1 | x | 1 |
| 0 | 1 | 0 | x | 0 |
| 0 | 1 | 1 | 0 | 1 |
| 0 | 1 | 1 | 1 | 0 |

A cache miss detector 156 receives the GHIT and GPE signals from the element suppression and output enable unit 154 on buses 153 and 155 and provides a CMISS signal to the CPU for initiating a cache miss sequence. A cache miss sequence is initiated by the CMISS signal whenever all of the GHIT signals are inactive or when any GPE signal is detected. The parity error causes the cache miss sequence immediately in order to reduce the time between an initial parity error and a potential second one. A second parity error would be fatal, but undetectable. If the cache miss is due to a parity error, a control signal CMISSPE is provided by the cache miss detector 156 on a line 159 to the write enable circuitry to cause updating of elements which had a parity error.

An update bit control 160 receives the FUPDATE and FFRCINVLD signals from the data selectors 60, 62, 64 on buses 78, 80, 82, the GHIT signals from the element suppression and output enable unit 154 on bus 153 and STORE and CMISS from the clock and control logic unit 152 on a bus 161. The update bit control 160 provides GUPDATE signals to each of the cache memory elements 40, 42, 44 on buses 52, 54, 56 for controlling the state of the update bits in the status fields of the cache cells and also provides an encoded ETM, element to modify, signal, indicating which cache cell in an addressed set is to be modified during a replacement cycle.

The update bit control 160, in general, contains logic for interpreting the FUPDATE bits collectively and determining which memory element to modify. In addition, the update bit control 160 modifies the state of the FUPDATE signals and provides new GUPDATE signals so that a first-in first-out replacement algorithm is implemented. The algorithm implemented by the update bit control 160 is shown in Table 4 for a cache memory having four elements a, b, c and d. The table can be modified for the three element case described herein by dropping one of the columns, such as column d. Similarly, the table can be expanded for more than four elements. All that is required is that the current state indicate the last element modified. This is done in the normal case by changing the state of the update bit for the cache cell that is modified. The state diagram of Table 4 does not include all possible states. The undefined states are not expected to occur, but could occur in the event of a power up condition or a parity problem. In these cases, the update bit control 160 detects the next element to modify in such a way as to enter a legal state.

TABLE 4

| FUPDATE Current State | | | | ETM | FUPDATE Next state | | | |
|---|---|---|---|---|---|---|---|---|
| a | b | c | d | Element to modify | a | b | c | d |
| 0 | 0 | 0 | 0 | a | 1 | 0 | 0 | 0 |
| 1 | 0 | 0 | 0 | b | 1 | 1 | 0 | 0 |
| 1 | 1 | 0 | 0 | c | 1 | 1 | 1 | 0 |
| 1 | 1 | 1 | 0 | d | 1 | 1 | 1 | 1 |
| 1 | 1 | 1 | 1 | a | 0 | 1 | 1 | 1 |
| 0 | 1 | 1 | 1 | b | 0 | 0 | 1 | 1 |
| 0 | 0 | 1 | 1 | c | 0 | 0 | 0 | 1 |
| 0 | 0 | 0 | 1 | d | 0 | 0 | 0 | 0 |

During stores into the cache memory, the GUPDATE bit for the next element to modify (ETM) is handled differently from the rest of the GUPDATE bits. Table 5 shows the update bit function for CMISS and STORE. The GUPDATE bit for the ETM is equal to the inverted value of the FUPDATE bit. For the rest of the update bits, the GUPDATE bit is equal to the FUPDATE bit. The algorithm is modified in accordance with Table 5 in such a way as to avoid having the ETM, element to modify, signal point to the element just modified. The examples shown in Table 6 illustrate the modification. EM in Table 6 refers to the element modified. The cache miss example shows a case where ETM is pointing to element c. All of the update bit circuits invert the FUPDATE bit to generate GUPDATE. The write enable control 162 modifies element c and the next state of the FUPDATE bits points to element d.

In the store cases, the element to modify, ETM, is c. But now, the GUPDATE bits for all elements except the ETM remain in the same state as FUPDATE, and the GUPDATE bit of the ETM is inverted. This has a positive effect on the next state of the FUPDATE bits. The first store example shows no hits. Element c is modified, and the new ETM points to element d. The second store example has a hit on element b. The GUPDATE bit of element b is preserved. By preserving the state of FUPDATE after the write enable control logic modifies element b, the new ETM will continue to point to element c. The third store example shows what happens when the GHIT signal for the ETM is active. Element c gets a hit. If the state of the FUPDATE bits for this case is preserved, then, after the write enable, the new ETM would point to element c. This is not desirable since the basic goal of any replacement algorithm is to keep the most recent data resident in the cache memory. By allowing the update bit to toggle, the new ETM will point to element d.

TABLE 5

| FUPDATE | ETM | STORE | CMISS | GUPDATE |
|---|---|---|---|---|
| 0 | x | 0 | 1 | 1 |
| 1 | x | 0 | 1 | 0 |
| 0 | 0 | 1 | 0 | 0 |
| 1 | 0 | 1 | 0 | 1 |
| 0 | 1 | 1 | 0 | 1 |
| 1 | 1 | 1 | 0 | 0 |

TABLE 6

| FUPDATE | | | | GHIT | | | | GUPDATE | | | | ETM | EM | NEXT FUPDATE | | | | NEXT ETM |
|---|---|---|---|---|---|---|---|---|---|---|---|---|---|---|---|---|---|---|
| a | b | c | d | a | b | c | d | a | b | c | d | | | a | b | c | d | |
| Cache miss example: | | | | | | | | | | | | | | | | | | |
| 1 | 1 | 0 | 0 | x | x | x | x | 0 | 0 | 1 | 1 | c | c | 1 | 1 | 1 | 0 | d |
| Store example: | | | | | | | | | | | | | | | | | | |
| 1 | 1 | 0 | 0 | 0 | 0 | 0 | 0 | 1 | 1 | 1 | 0 | c | c | 1 | 1 | 1 | 0 | d |
| 1 | 1 | 0 | 0 | 0 | 1 | 0 | 0 | 1 | 1 | 1 | 0 | c | b | 1 | 1 | 0 | 0 | c |
| 1 | 1 | 0 | 0 | 0 | 0 | 1 | 0 | 1 | 1 | 1 | 0 | c | c | 1 | 1 | 1 | 0 | d |

A write enable control 162 receives the ETM, element to modify, signal from the update bit control 160 and provides WRITE ENABLE signals to the cache memory elements 40, 42, 44 on buses 52, 54, 56. The write enable control 162 also receives STORE, CMISS, GHIT, GPE and CMISSPE signals. In addition, a TCACHE+clock signal is coupled from the clock control logic unit 152. The basic strategy for generating the WRITE ENABLE signal is shown above in Table 4 which deals with cache miss cases without parity errors. On stores, the WRITE ENABLE signal is issued to all memory elements with their GHIT signals active. If no GHIT signals are active, then the ETM is used. On cache misses, the ETM is used. In the event of a parity error, if the reference was a read, a cache miss sequence is initiated. Provided the FRCINVLD bit isn't set, all elements that indicate a parity error will be updated along with the normal ETM. If the ETM has a parity error, then the first element without a parity error is also modified so that during the reread of the cache memory after the cache update, valid data can be selected from at least one cache element. The ENPDSEL signal is used to enable element data without parity errors onto the BC cache bus 86.

The clock and control logic unit 152 controls clock signals and interfaces to the CPU. The clock section receives the system clock SYSCLK+signal and creates the TCDAT+, TCACHE+and TERR+clock signals at the appropriate times during cache accesses and cache miss sequences. During a cache miss sequence, the control logic issues the ENPDSEL signal to the element suppression and output enable unit 154 to enable parity in the element data selection function. The CACHE ADDR CONTROL signal tells the cache address logic 50 that a backup copy of the cache miss address should be sent to the cache address registers.

An error detection unit 164 receives the GPE, GHIT, CMISS, PE and TERR+signal and provides a SOFT/-HARD ERROR and a FATAL ERROR signal to the CPU. A fatal error occurs when a parity error appears in all elements for a particular index. Parity errors are reported to the CPU via the error detection unit 164. On every cache access, read or store, the suppressed parity error signals GPE are sampled for errors. When an error occurs, the CPU is notified of a recoverable error. The SOFT/HARD ERROR signal is sent to the CPU indicating that a recoverable error has occurred. If a FATAL ERROR is detected during reread after a cache update, then the CPU will give higher priority to the fatal error condition. After receiving a SOFT/-HARD ERROR signal, the CPU determines whether the error was a transient error or whether a cache cell is permanently damaged. This can be done in various ways requiring varying amounts of hardware.

In a preferred embodiment, a microcode algorithm performs a run time diagnostic over a period of time. The diagnostic program is initiated by the hardware timer that is used for maintaining wall clock time on the CPU. When invoked, the diagnostic begins a cache test that searches for hard cache errors. After testing a portion of the cache memory, the diagnostic returns control to the CPU and waits for the next interrupt. When a hard failure is detected, the appropriate cache cell is forced invalid by setting its FRCINVLD bit. The diagnostic program also reports soft and hard errors to the operating system's error log. The approach utilizing a diagnostic program avoids requiring the hardware to remember the address of the error.

In an alternate embodiment, the faulty address is saved. In this embodiment, errors are responded to and the faulty cache cells are mapped out in a shorter time. However, additional hardware is required. In another hardware solution, the status registers are queried before updating the cache elements, and the information is used to automatically set the FRCINVLD bits without any microcode intervention.

In operation, an ADDRESS is supplied to the cache memory elements 40, 42, 44 on bus 49 and the tag portion of the physical memory address is supplied on bus 66 to data selectors 60, 62, 64. A set of cache cells in the memory elements 40, 42, 44 is addressed by the ADDRESS signal and the tag field stored in the cache cells is compared with the BPMA signal. When the tag field and the BPMA signals are equal, a HIT signal is provided, indicating that the referenced location has been found.

During the read cycle, the data from the cell which registered a HIT signal is supplied to the CPU unless the force bit indicates that the cache cell is defective or a parity error has been found.

During a store into the cache memory, the cache memory elements 40, 42, 44 are addressed in the same manner as for a read, and the data selectors 60, 62, 64 compare the tag field and the BPMA signals. If a hit is registered, the data in the cache cell where the hit registered is updated. If no hit is registered, the data in one of the cache cells in the addressed set is replaced in accordance with the update strategy described above. No data is written into cache cells which have their force bits set.

The force bit and the update bit which are stored in distributed fashion in each of the cache cells with the data and field and tag field provide a simple and efficient way to control updating of the cache memory and to increase availability of the system by mapping out defective cache cells. Only a single bit per cache cell is required in order to select the cache cell for replacement in accordance with a first-in first-out algorithm. The force bit reduces system downtime by instructing the system to map out defective cache cells so that operation can be continued. A minimum of circuitry is required in connection with the update and force bits.

While there has been shown and described what is at present considered the preferred embodiments of the present invention, it will be understood by those skilled in the art that various changes and modifications may be made therein without departing from the scope of the present invention as defined by the appended claims.

What is claimed is:

1. A high availability set associative cache memory for use as a buffer between a main memory and a central processing unit, said cache memory comprising:

multiple sets of cache memory cells contained in a plurality of cache memory elements, each of the cache memory cells including a data field, a tag field and a status field that are stored in commonly addressed storage locations and are commonly accessed for reading and writing, and each of the sets of cache memory cells including a cache memory cell from each of said memory elements, said status field including a force bit having a set state that indicates a physically defective, nonoperational condition and a reset state that indicates a normal condition of a cache memory cell associated with said force bit;

read means for reading data from said cache memory including means for addressing a prescribed set of said cache memory cells, means for comparing said tag field for each cache memory cell in said prescribed set with a physical address and for providing a hit signal when one of the tag fields and said physical address are equal, and output enable means responsive to the reset state of said force bit and to said hit signal for enabling one of the cache memory cells in said prescribed set to provide its data field to said central processing unit;

write means for storing data from said main memory in said prescribed set of cache memory cells;

means for determining that a cache memory cell is in a physically defective, nonoperational condition and for setting said force bit for the physically defective cache memory cell to the set state; and means responsive to the set state of said force bit for the physically defective cache memory cell for suppressing data read therefrom and for preventing storage of data in the physically defective memory cell.

2. A cache memory as defined in claim 1 wherein said read means further includes means for checking parity of said data field and of said tag field and providing a parity error signal when a parity error is found, and wherein said output enable means is responsive to said parity error signal to inhibit the cache memory cell for which the parity error was found from providing its data field to said central processing unit.

3. A cache memory as defined in claim 2 wherein said status field further includes an update bit for each cache memory cell, the update bits for a set of cache memory cells collectively indicating an update status of the set and wherein said write means further includes replacement selection means responsive to the update bit for each of said cache memory cells in the prescribed set of said cache memory cells for selecting which cache memory cell of the prescribed set of said cache memory cells is to have its data replaced and means for changing said update bit when the data in said cache memory cell associated with said update bit is replaced.

4. A cache memory as defined in claim 3 wherein said replacement selection means is further responsive to said force bit to avoid storing data in any cache memory cell which has its force bit set.

5. A cache memory as defined in claim 3 wherein said replacement selection means employs a first-in first-out algorithm.

6. A cache memory as defined in claim 2 wherein said status field further includes an update bit for each cache memory cell, the update bits for a set of cache memory cells collectively indicating an update status of the set and wherein said write means further includes replacement selection means responsive to the update bit for each of said cache memory cells in the prescribed set of said cache memory cells for selecting which cache memory cell of the prescribed set of said cache memory cells is to have its data replaced and means for changing said update bit when the data in said cache memory cell associated with said update bit is replaced, and when the replacement selection means selects the cache memory cell associated with said update bit as next to have its data replaced and the data field associated with said update bit is accessed by said central processing unit.

7. A cache memory as defined in claim 2 wherein said status field further includes only a single update bit for each memory cell, the update bits for a set of cache memory cells collectively indicating an update status of the set and wherein said write means further includes replacement selection means responsive to the update bit for each of said cache memory cells for selecting which cache memory cell of the prescribed set of said cache memory cells is to have its data replaced and means for changing said update bit when the data in said cache memory cell associated with said update bit is replaced, and when the replacement selection means selects the cache memory cell as next to have its data replaced and the data field associated with said update bit is stored with data from said central processing unit.

8. A set associative cache memory for use as a buffer between a main memory and a central processing unit, said cache memory comprising:

multiple sets of cache memory cells contained in a plurality of cache memory elements, each of the cache memory cells including a data field, a tag field and a status field that are stored in commonly addressed storage locations and are commonly accessed for reading and writing, and each of the sets of cache memory cells including a cache memory cell from each of said memory elements, said status field including update information consisting of only a single update bit for each cache memory cell, the update bits for a set of cache memory cells collectively indicating an update status of the set;

read means for reading data from said cache memory including means for addressing a prescribed set of said cache memory cells, means for comparing said tag field for each cache memory cell in said prescribed set with a physical address and for providing a hit signal when one of the tag fields and said physical address are equal, and output enable means responsive to said hit signal for enabling one of the cache memory cells in said prescribed set to provide its data field to said central processing unit; and write means for storing data from said main memory in said prescribed set of cache memory cells including replacement selection means responsive to the update bit for each of said cache memory cells in the prescribed set of said cache memory cells for selecting which cache memory cell of the prescribed set of said cache memory cells is to have its data replaced, and means for changing said update bit when the data in said cache memory cell associated with said update bit is replaced and when the replacement selection means selects the cache memory cell associated with said update bit as next to have its data replaced and the data field associated with said update bit is stored with data from said central processing unit.

9. A cache memory as defined in claim 8 wherein said status field further includes a force bit which indicates a physically defective, nonoperational cache memory cell when it is set and wherein said replacement selection means is further responsive to said force bit to avoid storing data in any cache memory cell which has its force bit set.

10. A high availability set associative cache memory for buffering a main memory and a central processing unit, said cache memory comprising:
multiple sets of cache memory cells contained in a plurality of cache memory elements, each of the cache memory cells including a data field, a tag field and a status field that are stored in commonly addressed storage locations and are commonly accessed for reading and writing, and each of the sets of cache memory cells including a cache memory cell from each of said memory elements, each status field including a force bit which indicates a physically defective condition of a cache memory cell associated with said force bit;
read means for reading data from said cache memory cells;
write means for storing data in said cache memory cells;
means for determining that a cache memory cell is in a physically defective, nonoperational condition and for setting said force bit for the cache memory cell that is in a physically defective, nonoperational condition; and
means responsive to said force bit indicating a physically defective, nonoperational condition for suppressing data read from said cache memory cell associated with said force bit indicating a physically defective, nonoperational condition and for preventing storing data in said cache memory cell associated with said force bit indicating a physically defective, nonoperational condition.

11. A high availability set associative cache memory for buffering a main memory and a central processing unit, said cache memory comprising:
multiple sets of cache memory cells contained in a plurality of cache memory elements, each of the cache memory cells including a data field, a tag field and a status field that are stored in commonly addressed storage locations and are commonly accessed for reading and writing, and each of the sets of cache memory cells including a cache memory cell from each of said memory elements, each status field including update information consisting of only a single update bit for each cache memory cell, the update bits for a set of cache memory cells collectively indicating an update status of the set;
read means for reading data from said cache memory cells;
write means for storing data in said cache memory cells; and
replacement selection means responsive to the update bits in a set of cache memory cells for selecting a cache memory cell of said set for replacement and means for changing said update bit when the data in said cache memory cell associated with said update bit is replaced and when the replacement selection means selects the cache memory cell associated with said update bit as next to have its data replaced and the data field associated with said update bit is stored with data from said central processing unit.

12. A set associative cache memory for use as a buffer between a main memory and a central processing unit, said cache memory comprising:
multiple sets of cache memory cells contained in a plurality of cache memory elements, each of the cache memory cells including a data field, a tag field and a status field that are stored in commonly addressed storage locations and are commonly accessed for reading and writing, and each of the sets of cache memory cells including a cache memory cell from each of said memory elements, each status field including an update bit for each cache memory cell, the update bits for a set of cache memory cells collectively indicating an update status of the set;
read means for reading data from said cache memory cells;
write means for storing data in said cache memory cells; and
replacement selection means responsive to the update bit for each of said cache memory cells in a set of cache memory cells for selecting a cache memory cell of said set for replacement and means for changing said update bit only when the data in said cache memory cell associated with said update bit is replaced and when the replacement selection means selects the cache memory cell associated with said update bit as next to have its data replaced and the data field associated with said update bit is accessed by said central processing unit.

13. A cache memory as defined in claim 12 wherein said replacement selection means employs a first-in-first-out algorithm.

14. A set associative cache memory for use as a buffer between a main memory and a central processing unit, said cache memory comprising:
multiple sets of cache memory cells contained in a plurality of cache memory elements, each of the cache memory cells including a data field, a tag field and a status field that are stored in commonly addressed storage locations and are commonly accessed for reading and writing, and each of the sets of cache memory cells including a cache memory cell from each of said memory elements, each status field including update information consisting of only a single update bit for each cache memory cell, the update bits for a set of cache memory cells collectively indicating an update status of the set;
read means for reading data from said cache memory cells;
write means for storing data in said cache memory cells; and replacement selection means responsive to the update bit for each of said cache memory cells in a set of cache memory cells for selecting a cache memory cell of said set for replacement and means for changing said update bit only when the data in said cache memory cell associated with said update bit is replaced and when the replacement selection means selects the cache memory cell associated with said update bit as next to have its data replaced and the data field associated with said update bit is stored with data from said central processing unit.

15. A cache memory as defined in claim 14 wherein said replacement selection means employs a first-in-first-out algorithm.

* * * * *